(12) United States Patent
Carlson et al.

(10) Patent No.: US 11,499,610 B2
(45) Date of Patent: Nov. 15, 2022

(54) MOTOR STOP FOR A THROUGH-FRAME SLIDE OUT SYSTEM

(71) Applicant: Lippert Components, Inc., Elkhart, IN (US)

(72) Inventors: Brian Carlson, South Bend, IN (US); Patrick Quigley, South Bend, IN (US)

(73) Assignee: Lippert Components, Inc., Elkhart, IN (US)

( * ) Notice: Subject to any disclaimer, the term of this patent is extended or adjusted under 35 U.S.C. 154(b) by 217 days.

(21) Appl. No.: 16/845,342

(22) Filed: Apr. 10, 2020

(65) Prior Publication Data

US 2020/0325968 A1 Oct. 15, 2020

Related U.S. Application Data

(60) Provisional application No. 62/832,938, filed on Apr. 12, 2019.

(51) Int. Cl.
*F16H 25/20* (2006.01)
*B60P 3/34* (2006.01)

(52) U.S. Cl.
CPC .......... *F16H 25/2015* (2013.01); *B60P 3/34* (2013.01); *F16H 2025/204* (2013.01); *F16H 2025/2031* (2013.01); *F16H 2025/2062* (2013.01)

(58) Field of Classification Search
CPC .............. F16H 2025/204; F16H 25/2015
USPC ....................................... 74/89.37
See application file for complete search history.

(56) References Cited

U.S. PATENT DOCUMENTS

| | | | |
|---|---|---|---|
| 2,870,288 A | 1/1959 | Schmidt | |
| 4,357,505 A | 11/1982 | Bridges | |
| 5,758,918 A | 6/1998 | Schneider et al. | |
| 5,851,567 A | 12/1998 | Proni | |
| 6,109,683 A | 8/2000 | Schneider | |
| 6,116,104 A * | 9/2000 | Nagai | B23Q 16/001 74/89.32 |
| 6,312,358 B1 | 11/2001 | Goi et al. | |
| 9,252,649 B2 | 2/2016 | Kakiuchi et al. | |

FOREIGN PATENT DOCUMENTS

| | | | | |
|---|---|---|---|---|
| EP | 1729401 A2 * | 12/2006 | ............. | H02K 11/21 |
| GB | 920984 | 3/1963 | | |

OTHER PUBLICATIONS

Machine translation of EP 1729401 (Year: 2006).*

* cited by examiner

*Primary Examiner* — Randell J Krug
(74) *Attorney, Agent, or Firm* — Nixon & Vanderhye P.C.

(57) ABSTRACT

A motor stop mechanism for a motor including an output shaft includes a motor mounting surface to which the motor is attachable and a threaded drive shaft fixed to and rotatable with the motor output shaft. A trunnion threaded on the threaded drive shaft is displaceable between a retracted position and an extended position by forward and reverse rotation of the threaded drive shaft. A housing surrounds the threaded drive shaft and the trunnion, and a stop limit fixed to the housing defines the extended position of the trunnion. In use, when the trunnion reaches the stop limit, the motor is stopped.

17 Claims, 5 Drawing Sheets

MOTOR STOP FOR A THROUGH-FRAME SLIDE OUT SYSTEM

CROSS-REFERENCES TO RELATED APPLICATIONS

This application claims the benefit of U.S. Provisional Patent Application No. 62/832,938, filed Apr. 12, 2019, the entire content of which is herein incorporated by reference.

STATEMENT REGARDING FEDERALLY SPONSORED RESEARCH OR DEVELOPMENT (NOT APPLICABLE)

BACKGROUND

The invention relates to slide-out rooms for recreational vehicles and the like and, more particularly, to a motor stop for a through-frame slide out system. The application is related to U.S. application Ser. No. 16/708,619, the contents of which are hereby incorporated by reference.

In order to increase available interior space of recreational vehicles, e.g., motor homes and trailer homes, slide-out rooms or sections have been provided. During transit, these rooms are retracted and stored in the interior of the vehicle or trailer, with the exterior end wall of the slide-out room approximately flush with the adjacent exterior wall of the vehicle or trailer. To use the slide-out room, the vehicle is parked and leveled. The slide-out room is then slid outward from the vehicle, using the slide-out room support system, thereby increasing the interior space of the vehicle.

An exemplary support and drive system is described in U.S. Pat. No. 6,109,683, the contents of which are hereby incorporated by reference.

Existing drive and support systems include a motor-driven shaft that runs perpendicular to a rack and pinion driven frame on which the slide-out room rides. There has been an issue with existing designs with respect to effectively getting a through-frame system to stop at the desired points while preventing the room from running off its track and out of the vehicle.

BRIEF SUMMARY

The system of the described embodiments provides a motor stop for a through-frame slide out system to prevent the slide-out room and its supporting structure from running off the track and out of the vehicle. In some embodiments, a threaded drive shaft is driven by operation of a motor, and a trunnion is threaded on the threaded drive shaft. The trunnion is displaceable on the threaded drive shaft with rotation of the threaded drive shaft between a retracted position and an extended position. A housing surrounds the threaded drive shaft and the trunnion. A stop limit is fixed to the housing and defines the extended position of the trunnion. When the trunnion reaches the stop limit, the stop limit provides a hard stop that causes the slide system to stop in place and allows for the motor to cease running.

In an exemplary embodiment, a motor stop mechanism for a motor including an output shaft includes a motor mounting surface to which the motor is attachable, where the motor output shaft is positionable through the motor mounting surface. A threaded drive shaft is fixed to and rotatable with the motor output shaft, and a trunnion is threaded on the threaded drive shaft and displaceable on the threaded drive shaft with rotation of the threaded drive shaft. The trunnion is displaceable between a retracted position and an extended position by forward and reverse rotation of the threaded drive shaft. A housing surrounds the threaded drive shaft and the trunnion, and a stop limit fixed to the housing defines the extended position of the trunnion.

The stop limit may include a threaded set screw shaft secured to the housing. The mechanism may also include a threaded set screw insert secured on the threaded set screw shaft and engaging the housing. The threaded set screw insert may be directional. The stop limit may be adjustable by rotating the threaded set screw shaft relative to the threaded set screw insert.

The mechanism may also include a threaded guide shaft fixed to the housing, where the trunnion includes a guide shaft opening through which the threaded guide shaft may be disposed. The threaded guide shaft may include a stop nut at an end thereof defining the retracted position of the trunnion. The mechanism may also include a threaded guide shaft insert secured on the threaded guide shaft and engaging the housing. The threaded guide shaft insert may be directional.

A control circuit may be programmed to cut power to the motor when the trunnion reaches the extended position or the retracted position. In some embodiments, the control circuit may include a thermal circuit breaker that responds to heat build-up resulting from overloads of electrical current.

In another exemplary embodiment, a motor stop mechanism includes a motor mounting surface to which the motor is attachable, where the motor output shaft is positionable through the motor mounting surface. A threaded drive shaft is fixed to and rotatable with the motor output shaft, and a trunnion is threaded on the threaded drive shaft and displaceable on the threaded drive shaft with rotation of the threaded drive shaft. The trunnion includes a guide shaft opening, where the trunnion is displaceable between a retracted position and an extended position by forward and reverse rotation of the threaded drive shaft. A housing surrounds the threaded drive shaft and the trunnion, and a stop limit fixed to the housing defines the extended position of the trunnion. The stop limit includes a threaded set screw shaft fixed to the housing. A threaded guide shaft fixed to the housing is positioned through the guide shaft opening in the trunnion.

BRIEF DESCRIPTION OF THE DRAWINGS

These and other aspects and advantages will be described in detail with reference to the accompanying drawings, in which.

DETAILED DESCRIPTION

Figure 1:
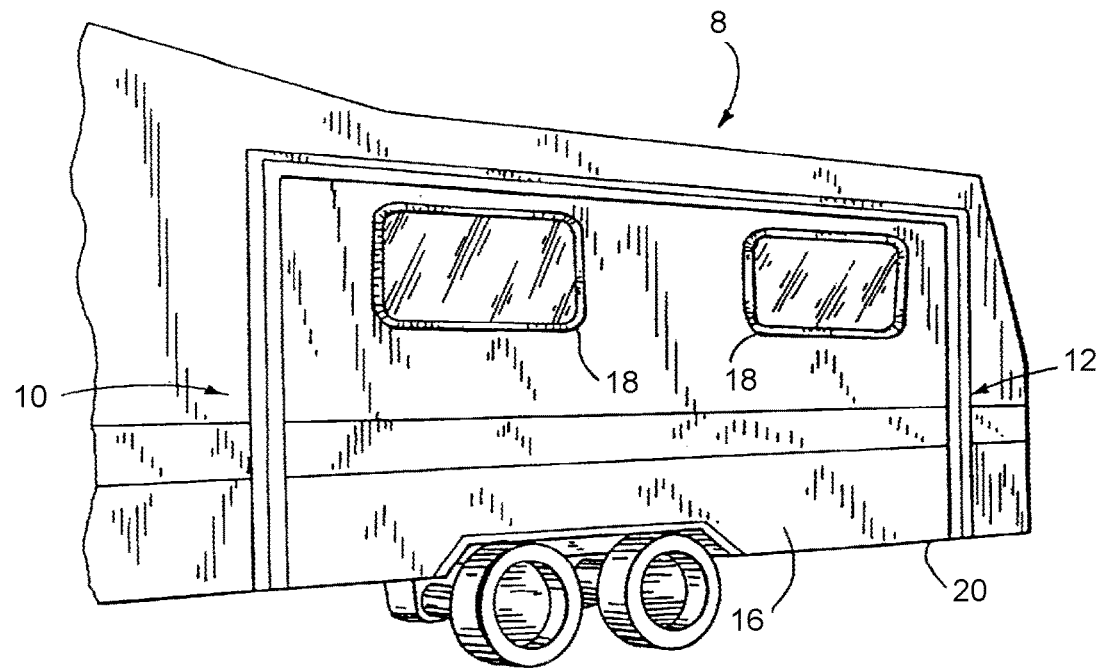
FIG. 1 is a partial perspective view of a slide-out room of a recreational vehicle in a retracted position.
Figure 2:
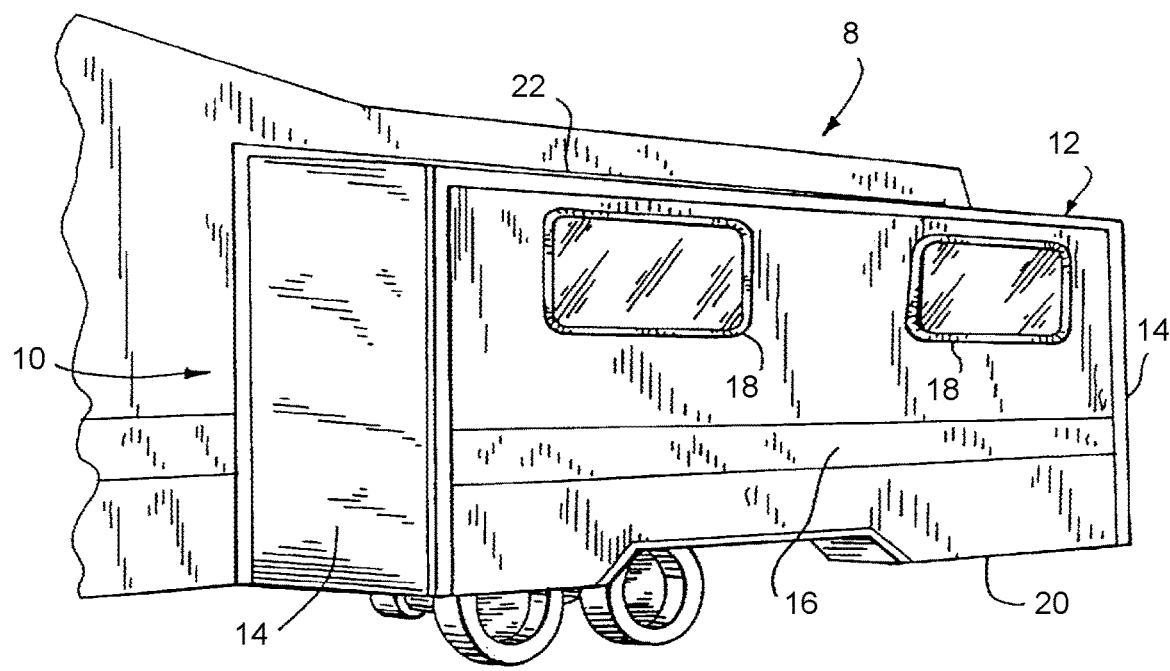
FIG. 2 is a partial perspective view of the slide-out room in an extended position.

Referring to FIGS. 1 and 2, a recreational vehicle 10 (generally referred to as a vehicle) is equipped with a laterally adjustable wing or slide-out room section used to provide additional interior space. It should be understood that the invention can also apply to expandable sections or compartments provided on other vehicles for use in construction, military, medical, education, mobile broadcast and other applications to expand the inside volume of a vehicle. The motor stop mechanism is applicable to alternative systems, and the description is not meant to be limited to the described exemplary application. That is, the mechanism can be utilized on other through frame slides, leveling systems, or the like or any system requiring limited displacement in two 180 degree reversible directions.

FIG. 1 illustrates the vehicle body 10 having mounted thereon an expandable, telescopic slide-out room section 12 incorporating the described embodiments in its fully retracted or inside position. FIG. 2 is a similar view with the slide-out section 12 in its fully extended or outside position. Slide-out section 12 may be rectangularly configured and includes a pair of sidewalls 14, an end wall 16, with two windows 18, a floor 20 and a roof 22. An arrangement for mounting the fixed frame assembly or outer rails of the described embodiments to the vehicle body 10 and driving the movement of the slide-out room section 12 is described in U.S. Pat. No. 5,758,918, the contents of which are hereby incorporated by reference. That system is an electric motor operated rack and pinion gear drive system for extending and retracting the slide-out frame assembly or inner rails relative to the outer rails.

Figure 3:
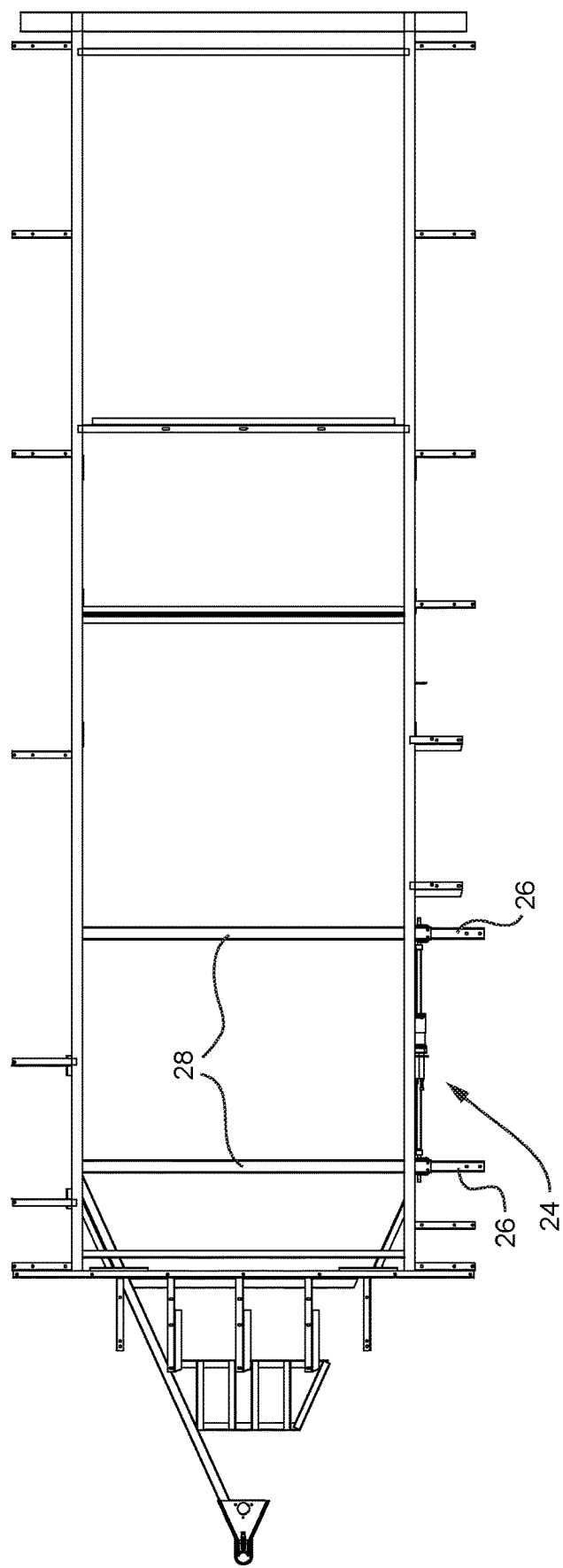
FIG. 3 is a plan view of the vehicle frame.
Figure 4:
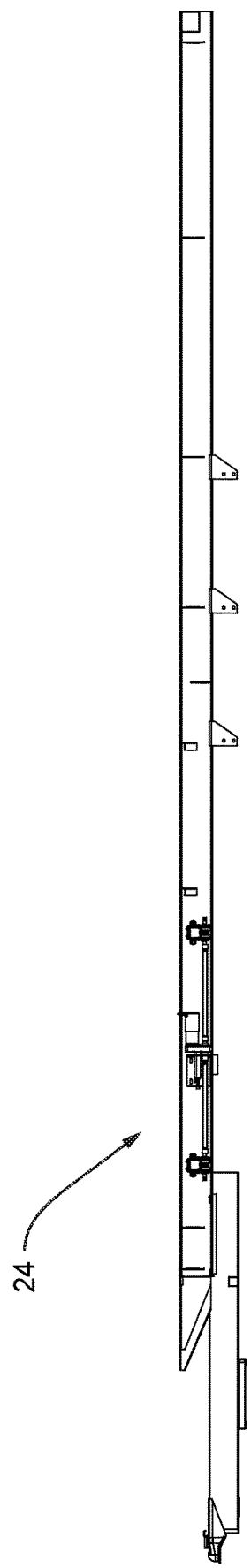
FIG. 4 is a side view of the vehicle frame showing the placement of the motor stop mechanism.
Figure 5:
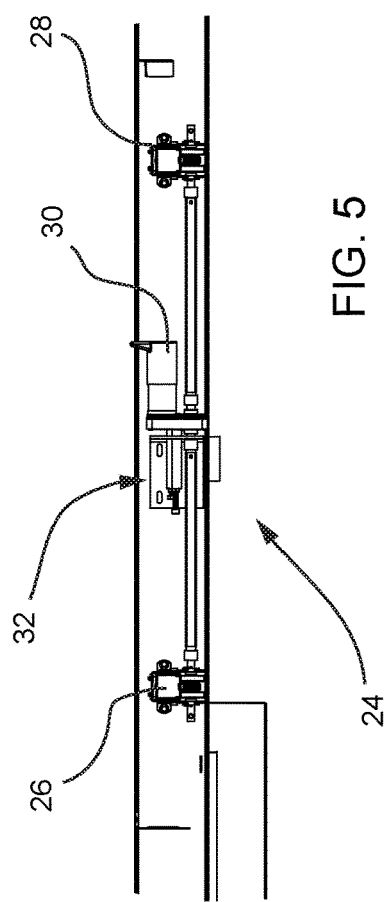
FIG. 5 is a detail view of the motor stop mechanism installed in the vehicle frame.

An exemplary drive system 24 is shown in FIGS. 3-5. The slide-out frame assembly or inner rail 26 is displaceable by the drive system 24 relative to a fixed frame assembly or outer rail 28. The slide-out room section 12 is supported on and displaceable with the slide-out frame assembly 26. The electric motor 30 includes an output shaft and drives the rack and pinion drive system 24 to position the slide-out room section 12 between the inside/fully retracted position and the outside/fully extended position. The motor stop mechanism 32 of the described embodiments is interposed between the motor 30 and the drive system 24.

Figure 6:
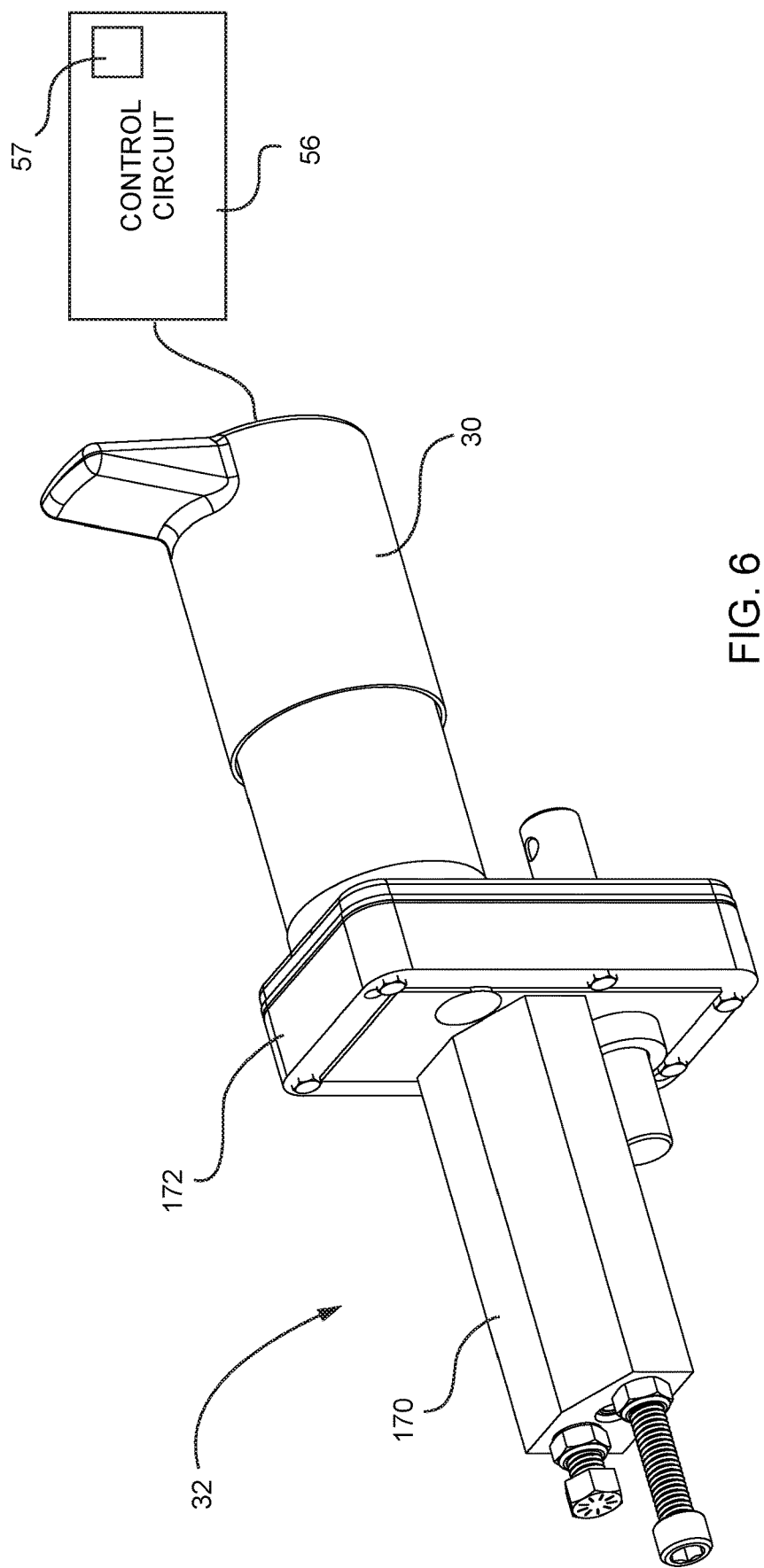
FIG. 6 shows the motor stop mechanism with a housing.
Figure 7:
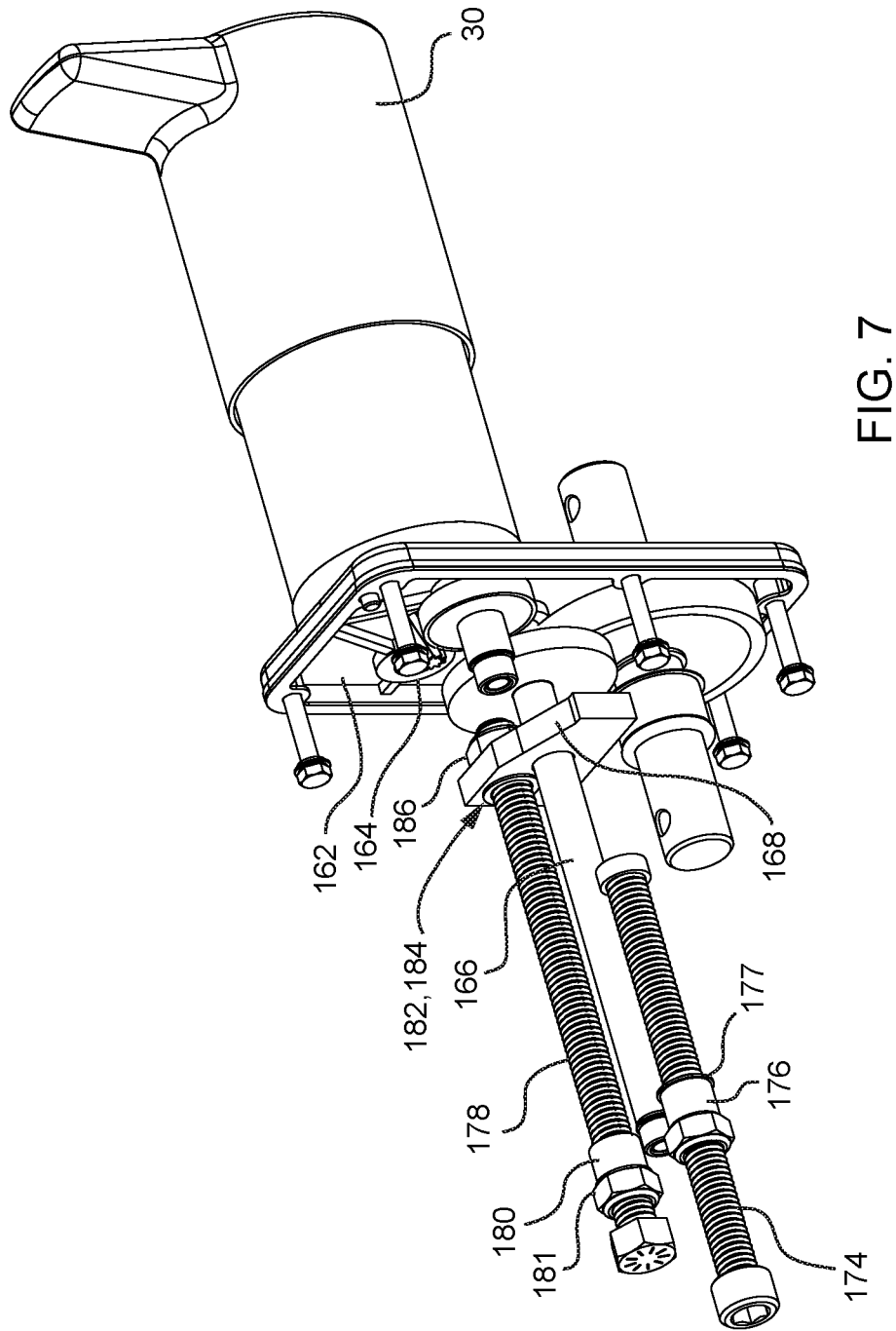
FIG. 7 shows the motor stop mechanism with the housing removed.

With reference to FIGS. 6 and 7, the motor stop mechanism 32 acts between the motor 30 and the drive system 24. The motor stop mechanism 32 effects a stop limit for the motor 30. The motor stop mechanism 32 includes a motor mounting surface 162 to which the motor 30 is attached. A motor output shaft 164 extends through the motor mounting surface 162. A threaded guide shaft 166 is fixed to and rotatable with the motor output shaft 164. In some embodiments, the threaded drive shaft 166 is fixed to the motor output shaft 164 through a gear reducer/gearbox or the like. That is, the threaded guide shaft 166 may be coupled on any intermediate shaft within the gearbox. In addition to the motor output shaft 164, the mechanism may include a gearbox output shaft to which the threaded guide shaft 166 may be directly connected. A trunnion 168 is threaded on the threaded drive shaft 166 and is displaceable on the threaded drive shaft 166 with rotation of the threaded drive shaft. The trunnion 168 is displaceable between a retracted position and an extended position by forward and reverse rotation of the threaded drive shaft 166 via the motor 30.

With reference to FIG. 6, a housing 170 is coupled with the motor mounting surface 162 via a gear cover 172 or the like. The housing 170 surrounds the threaded drive shaft 166 and the trunnion 168. A stop limit 174 is fixed to the housing 170 and defines the extended position of the trunnion 168. As shown, the stop limit 174 is in the form of a threaded set screw shaft that is fixed to the housing 170 via suitable connectors. A threaded set screw insert 176 is secured on the threaded set screw shaft (stop limit) 174 and engages the housing 170. Preferably, the threaded set screw insert 176 is directional to prevent the insert from being forced out of the housing 170. In some embodiments, the threaded set screw insert includes a flange 177 on one end. The flange 177 is oriented to prevent the insert from being forced from housing 170. The flange acts in opposition to a force applied on the stop limit 174 by the trunnion 168.

The motor stop mechanism 32 may also be provided with a threaded guide shaft similarly fixed to the housing 170 via a threaded guide shaft insert 180 secured on the threaded guide shaft 178. The trunnion 168 may be provided with a guide shaft opening 182 including a bushing 184 through which the threaded guide shaft 178 is disposed. The guide shaft opening 182 and bushing 184 are sized to provide clearance so that the trunnion 168 traverses over the threads of the threaded guide shaft 178. The threaded guide shaft 178 is also provided with a stop nut 186 at a proximal end thereof that defines the retracted position of the trunnion 168. The stop nut 186 may be in the form of a distorted thread locknut, a locknut with a set screw, or the like. The threaded guide shaft insert 180 is also directional and includes a flange 181 to secure the threaded guide shaft 178 in the housing 170.

The stop limit 174 and the stop nut 186 are selectively adjustable. In an alternative configuration, one stop may be adjustable while the other is fixed. Instead of the bolts shown, the stops may alternatively be machined into the housing 170. The stops may alternatively be comprised of mechanical limit switches, mag switches or optical switches in place of stop bolts. Still further, a Hall Effect may be used in place of the threaded shaft and stop bolts.

In use, the motor 30 is operated to rotate the threaded drive shaft 166 via a gear reduction mechanism. The trunnion 168 translates on the threaded drive shaft 166 in a direction that depends on the motor rotation direction. When displacing the trunnion 168 from its retracted position toward its extended position, the trunnion 168 engages the stop limit 174, which defines the extended position of the trunnion 168. In the opposite direction, the trunnion 168 is displaced on the threaded drive shaft 166 until it reaches the stop nut 186 at the end of the threaded guide shaft 178.

A control circuit 56 may be connected with the motor 30, where the control circuit 56 is programmed to cut power to the motor 30 when the trunnion 168 reaches the extended position. That is, when the trunnion 168 reaches the stop limit 174, the stop limit provides a hard stop that causes the system to stop in place and allows for the motor 30 to cease running. A similar signal is generated when the trunnion reaches the stop nut 186. In some embodiments, the control circuit 56 may include a thermal circuit breaker 57 that responds to heat build-up resulting from overloads of electrical current. In this context, when the trunnion engages the stop limit 174 or the stop nut 186, current to the motor 30 will cause a heat build-up, and the thermal circuit breaker 57 will cut power to the motor 30. Alternative components and mechanisms for signaling the motor 30 to cease are described in the noted U.S. application Ser. No. 16/708,619.

In an exemplary construction, the threaded drive shaft 166 is configured to rotate 67 rotations for a 44-inch stroke slide-out room. The shaft 166 is configured to rotate 27 times for an 18-inch slide-out room. An exemplary thread pitch for the threaded drive shaft 166 is 14-2, which will cause the drive shaft 166 to translate the trunnion 168 by 5.29 inches for a 44-inch slide-out room and 2.16 inches for an 18-inch slide-out room. The threaded set screw shaft 174 and the threaded guide shaft 178 allow fine adjustments of the stops, for example due to manufacturing tolerances in slide construction. In one application, the torque of the threaded drive shaft 166 may be 194 in-lb. The torque in combination with the 14-2 thread creates 17,000 lbf on the bolt stops. The material for the components was measured to take the stress of the mechanism using finite element analyses. As would be appreciated by those of ordinary skill in the art, standard thread can alternatively be used with calculations of pounds-force (lb-f) and linear travel of stop.

The motor stop mechanism of the described embodiments enables a through-frame system for a slide-out room section to stop at a desired point without allowing the room to run off the track and out of the vehicle. The stop limit(s) can be accurately set, and when the trunnion reaches the outer stop limit, the motor is caused to cease running, and the slide out system stops in place.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A motor stop mechanism for a motor including an output shaft, the motor stop mechanism comprising:
   a motor mounting surface to which the motor is attachable, the motor output shaft being positionable through the motor mounting surface;
   a threaded drive shaft fixed to and rotatable with the motor output shaft;
   a trunnion threaded on the threaded drive shaft and displaceable on the threaded drive shaft with rotation of the threaded drive shaft, wherein the trunnion is displaceable between a retracted position and an extended position by forward and reverse rotation of the threaded drive shaft;
   a housing surrounding the threaded drive shaft and the trunnion; and
   a stop limit fixed to the housing and defining the extended position of the trunnion, wherein the stop limit is at least partially disposed outside of the housing such that the stop limit is adjustable from outside of the housing.

2. The motor stop mechanism according to claim 1, wherein the stop limit comprises a threaded set screw shaft secured to the housing.

3. The motor stop mechanism according to claim 2, further comprising a threaded set screw insert secured on the threaded set screw shaft and engaging the housing.

4. The motor stop mechanism according to claim 3, wherein the threaded set screw insert is directional.

5. The motor stop mechanism according to claim 3, wherein the stop limit is adjustable by rotating the threaded set screw shaft relative to the threaded set screw insert.

6. The motor stop mechanism according to claim 1, further comprising a threaded guide shaft fixed to the housing, the trunnion including a guide shaft opening through which the threaded guide shaft is disposed.

7. The motor stop mechanism according to claim 6, wherein the threaded guide shaft comprises a stop nut at an end thereof defining the retracted position of the trunnion.

8. The motor stop mechanism according to claim 6, further comprising a threaded guide shaft insert secured on the threaded guide shaft and engaging the housing.

9. The motor stop mechanism according to claim 8, wherein the threaded guide shaft insert is directional.

10. The motor stop mechanism according to claim 1, further comprising a control circuit programmed to cut power to the motor when the trunnion reaches the extended position or the retracted position.

11. The motor stop mechanism according to claim 10, wherein the control circuit comprises a thermal circuit breaker that responds to heat build-up resulting from overloads of electrical current.

12. A motor stop mechanism for a motor including an output shaft, the motor stop mechanism comprising:
    a motor mounting surface to which the motor is attachable, the motor output shaft being positionable through the motor mounting surface;
    a threaded drive shaft fixed to and rotatable with the motor output shaft;
    a trunnion threaded on the threaded drive shaft and displaceable on the threaded drive shaft with rotation of the threaded drive shaft, the trunnion including a guide shaft opening, wherein the trunnion is displaceable between a most retracted position and a most extended position by forward and reverse rotation of the threaded drive shaft;
    a housing surrounding the threaded drive shaft and the trunnion;
    a stop limit fixed to the housing and defining the most extended position of the trunnion, wherein the stop limit comprises a threaded set screw shaft fixed to the housing; and
    a threaded guide shaft fixed to the housing and positioned through the guide shaft opening in the trunnion such that the trunnion traverses over the threaded guide shaft and maintains engagement with the threaded guide shaft as the trunnion is displaced between the most retracted position and the most extended position.

13. The motor stop mechanism according to claim 12, further comprising a threaded set screw insert secured on the threaded set screw shaft and engaging the housing.

14. The motor stop mechanism according to claim 12, wherein the threaded guide shaft comprises a stop nut at an end thereof defining the most retracted position of the trunnion.

15. The motor stop mechanism according to claim 12, further comprising a threaded guide shaft insert secured on the threaded guide shaft and engaging the housing.

16. The motor stop mechanism according to claim 12, further comprising a control circuit programmed to cut power to the motor when the trunnion reaches the most extended position or the most retracted position.

17. The motor stop mechanism according to claim 16, wherein the control circuit comprises a thermal circuit breaker that responds to heat build-up resulting from overloads of electrical current.

* * * * *